United States Patent Office

3,741,895
Patented June 26, 1973

3,741,895
COMPOSITION AND METHOD FOR IMPROVING
FLUIDS FOR SECONDARY OIL RECOVERY
Willis G. Routson and Michael Neale, Walnut Creek,
Calif., assignors to The Dow Chemical Company,
Midland, Mich.
No Drawing. Filed Apr. 1, 1971, Ser. No. 130,539
Int. Cl. E21b 47/20; G01n 31/22
U.S. Cl. 252—8.55 D                              4 Claims

ABSTRACT OF THE DISCLOSURE

When it is desired to maintain an excess of hydrosulfite ions to provide a reductive environment in an aqueous medium employed for waterflooding in secondary oil recovery, the incorporation of a small amount of a reductive index agent, such as methylene blue, in said medium provides a method for determining when the hydrosulfite ions have been depleted as by absorption of oxygen. A preferred composition includes a mobility control agent succh as hydrolyzed polyacrylamide in the medium.

BACKGROUND OF THE INVENTION

In the practice of secondary oil recovery wherein an aqueous fluid is injected into an oil-bearing formation to drive oil to a production well, it has been shown, for example, in U.S. Pat. 3,343,601, that desirable results are obtained by incorporating a hydrosulfite in the aqueous flooding medium. Thus, the use of an alkali metal hydrosulfite such as sodium hydrosulfite ($Na_2S_2O_4$) in aqueous flooding media prevents the plugging of the oil-bearing formation by ferric hydroxide and also minimizes oxidative breakdown of long chain polymers which may be incorporated in the flooding medium to control mobility of the fluid. However, under oil field conditions there are frequently no chemical laboratory facilities available in which to ascertain whether sufficient hydrosulfite has been incorporated in the flooding medium to produce the desired reducing environment. A further problem can arise from consumption of the hydrosulfite by air introduced into the flooding medium through faulty pump or valve packings while the medium is being pumped from the central mixing station to the well head. Thus, it would be highly desirable to have available some mechanism by which oil-field operating personnel could readily determine whether any particular batch or sample of flooding medium contains sufficient hydrosulfite to produce the desired reducing environment.

SUMMARY OF THE INVENTION

In accordance with the present invention there is provided a method for determining under field conditions whether a proper reductive environment is present in an aqueous fluid and a composition adapted for use in said method. The composition of the invention comprises a high-molecular-weight, water-soluble polymer, an alkali metal hydrosulfite and a reductive index agent. The method and composition have utility in providing a simple color index by which oil-field workers can ascertain whether sufficient hydrosulfite has been incorporated in the aqueous fluid to maintain the desired reductive environment for injection into a substerranean oil-bearing formation.

In the present specification and claims the expression "reductive index agent" refers to a chemical compound which has little or no visible color intensity under reducing conditions, e.g., in the presence of excess hydrosulfite ions, but which shows an intense and readily detected color when free oxygen is present in the aqueous medium in which said agent is dispersed.

In its broadest aspect, the present invention involves the incorporation of a reductive index agent in an aqueous fluid containing an alkali metal hydrosulfite while said fluid is maintained in a substantially oxygen-free condition. The reductive index agent is an organic compound, having the property as defined above of showing little or no color intensity in the reducing environment provided by an excess of hydrosulfite ions but being converted to an intensely colored species in the presence of free oxygen in the solution. Such an index agent must, of course, have sufficient water solubility to provide the desired intensity of color when in the oxidized form. Thus, in practice, if the hydrosulfite in the aforesaid aqueous fluid is depleted by the entry of oxygen into the system a marked change in color will occur. Such a solor change can be visually observed by the oil-field worker or, preferably, the stream of fluid can be passed through the input beam to an electronic colorimeter, spectrophotometer or other color sensing means which can generate an electrical signal when the color change is detected. Such a signal can be used to trigger an alarm or to activate servomechanism to increase the dosage of hydrosulfite in the fluid or to shut down the flow of said fluid.

Suitable reductive index agents include those dyestuffs and related compounds which are reduced to a so-called "leuco" form by hydrosulfite but which oxidize readily at ambient temperature in the presence of free oxygen to give the intensely colored form of the compound. Good results have been obtained when employing, as reductive index agents, indigo and related compounds such as indigo carmine, indole-thianaphthenes, thiazene derivatives such as methylene blue, and triphenylmethane derivatives such as malachite green and the like. A preferred reductive index agent by reason of its adaptability and availability is methylene blue.

In another embodiment of the invention, a concentrate composition is provided which is adapted to be dissolved in water or oil field brine to produce a driving fluid for secondary oil recovery. Such concentrate compositions comprise a major proportion of a polymeric mobility control agent in intimate mixture with a minor proportion of alkali metal hydrosulfite and a small but effective amount of a reductive index agent. Typically such a concentrate composition will comprise from about 90 to 99 percent by weight of polymeric mobility control agent, from 0.5 to about 9.9 percent by weight of an alkali metal hydrosulfite and from about 0.1 to about 0.5 percent by weight of a reductive index agent. As polymeric mobility control agents one may employ any of the various functional, water-soluble, long-chain, synthetic polymers having resistance properties as disclosed in U.S. Pat. 3,282,337 as well as biopolymers such as the heteropolysaccharides described in U.S. Pat. 3,305,016. A preferred mobility control agent is a high-molecular-weight polyacrylamide having from about 15 to 30 percent of its carboxamide groups replaced by sodium carboxylate groups.

In a representative operation, a high-molecular-weight, hydrolyzed polyacrylamide, characterized by a viscosity of about 14 centipoises at 25° C. for a 0.3 percent by weight solution thereof in aqueous 4 percent sodium chloride solution adjusted to a pH of 7 and having about 22 percent of the original carboxamide groups hydrolyzed to sodium carboxylate groups, was dissolved in water together with sufficient sodium hydrosulfite and methylene blue to produce a medium containing 500 parts of the polyacrylamide, 25 parts of the hydrosulfite and 1.25 parts of methylene blue per million parts by weight of aqueous medium. The resulting aqueous medium was a water-clear liquid which on exposure to air turned to a deep blue color. When this determination was repeated employing malachite green in place of the methylene blue, a colorless medium was obtained which turned blue-green after exposure to air. Similarly, use of indigo carmine as the reductive index agent gave an initial medium having a little yellow hue which changed to deep blue when exposed to oxygen in the air.

In a further operation, a concentrate composition was prepared by intimate mechanical mixing of the following:

| Ingredient: | Pounds |
|---|---|
| Polymer | 94.75 |
| Sodium hydrosulfite | 5.0 |
| Methylene blue | 0.25 |

The polymer employed was a high-molecular-weight, hydrolyzed polyacrylamide sold by The Dow Chemical Company under the trademark Pusher 700. The composition was adapted for solution in oil-field brine with minimal exposure to air to produce a medium containing 500 to 1500 parts or more of polymer per million parts of medium and suitable for secondary oil recovery and the like.

We claim:

1. A concentrate composition which comprises an intimate mixture of from about 90 to 99 percent by weight of a water-soluble high molecular weight polyacrylamide having from about 15 to 30 percent of its carboxamide groups hydrolyzed to sodium carboxylate groups, from 0.5 to about 9.9 percent by weight of an alkali metal hydrosulfite and from about 0.1 to about 0.5 percent by weight of a reductive index agent selected from the group consisting of methylene blue, indigo carmine and malachite green.

2. A composition according to claim 1 wherein the hydrosulfite is sodium hydrosulfite and the reductive index agent is methylene blue.

3. In a method for providing an injection fluid for oilfields wherein an alkali metal hydrosulfite is dissolved in an aqueous medium in an amount sufficient to provide a reductive environment, said aqueous medium also containing a polymeric mobility control agent, the improvement which comprises incorporating into said medium an effective amount of a reductive index agent selected from the group consisting of methylene blue, indigo carmine and malachite green to produce an intense color therein in the presence of free oxygen and passing said injection fluid through a color sensing means to generate an electrical signal when a color change occurs.

4. The method according to claim 3 wherein the hydrosulfite is sodium hydrosulfite and the reductive index agent is methylene blue.

References Cited
UNITED STATES PATENTS

| | | | |
|---|---|---|---|
| 3,343,601 | 9/1967 | Pye | 166—275 X |
| 3,257,160 | 6/1966 | Zimmermann et al. | 21—2.7 |
| 2,820,001 | 1/1958 | Raifsnider et al. | 23—230 X |
| 3,106,525 | 10/1963 | Schmid et al. | 252—8.55 X |
| 3,039,529 | 6/1962 | McKennon | 252—8.55 X |
| 3,282,337 | 11/1966 | Pye | 166—275 |
| 3,305,016 | 2/1967 | Lindblom et al. | 252—8.55 X |

HERBERT B. GUYNN, Primary Examiner

U.S. Cl. X.R.

23—230 C; 166—252, 274; 252—408